Jan. 17, 1950     J. P. FERGUSON     2,494,992
CATHODE-RAY TUBE

Filed April 2, 1943

INVENTOR
J. P. FERGUSON
BY
ATTORNEY

Patented Jan. 17, 1950

2,494,992

UNITED STATES PATENT OFFICE 2,494,992

CATHODE-RAY TUBE

John P. Ferguson, Spokane, Wash., assignor to Westinghouse Electric Corporation, East Pittsburgh, Pa., a corporation of Pennsylvania Application April 2, 1943, Serial No. 481,541

10 Claims. (Cl. 250—164)

This invention relates to cathode ray tubes, and more particularly, to such having oscilloscope screens with means to apply a scale thereto.

The primary object of my invention, generally considered, is to avoid the difficulty in seeing patterns or images on the oscilloscope screen of a cathode ray tube, and to apply to said screen a self-luminous free-from-parallax scale which requires no additional equipment or adjustment.

Another object of my invention is to form the oscilloscope screen of a cathode ray tube with a color-selective filter, making for ease in visibility of images thereon, and a ruled luminous scale on said screen, the filter or glass cover thereof.

A further object of my invention is to avoid the difficulty in seeing patterns or images on the oscilloscope screen of a cathode ray tube by using a color-selective filter in front of the screen, or making the screen-carrying portion of the tube of glass having the desired filtering action, and ruling lines with luminous paint to form a parallax-free scale on the tube, filter, or filter-covering; whereby additional equipment and adjustment of said scale are avoided.

Other objects and advantages of the invention, relating to the particular arrangement and construction of the various parts, will become apparent as the description proceeds.

Referring to the drawing illustrating my invention:

In using a cathode ray tube having an oscilloscope screen for observation and study of various electrical phenomena, it is often difficult to see the patterns or images on the screen because of bright external illumination. Common practices have included placing a hood around the screen and increasing the intensity of the electron beam which forms the image. Such procedure, however, tends to distort and broaden the beam with resultant loss in focus. This has been found particularly true where the oscilloscope has been used to measure peak voltages and currents of igniters in mercury-arc rectifiers. In this type of measurement, the electron beam is set at full intensity, naturally tending to light up the entire screen, in addition to the fact that the beam will burn the screen if left for any great length of time.

A very convenient method of eliminating this trouble is to use a color-selective filter, or form the screen-carrying portion of the tube of color-filtering material such as green glass. The average medium-persistence screen used in cathode ray oscilloscopes emits light in a rather narrow spectral band, that is, green light in the range between 5000 and 5500 Angstrom units.

It will be seen that if a filter is used to cover this range, it will pass the light from the screen unaffected, but will absorb all external stray light which might be reflected from the screen. Because of this it is possible to observe images even under bright external illumination.

However, a luminous image on a dark background requires a luminous scale. Several methods have been used to project such a scale without parallax on the screen. They generally require a projector to throw the image of a scale on the screen or a semi-transparent mirror placed in front of said screen. This entails additional equipment and is cumbersome as it requires adjustment to retain a parallax free scale.

In accordance with my invention, I propose a simpler and more convenient scale which is ruled on either the color-selective filter, the protective cover for said filter, or the screen-carrying portion of the cathode ray tube, if formed of filter material such as green glass. The material forming said scale is desirably a luminescent paint. Such paint after a short exposure to light is luminous for several hours. The ruled lines will glow and emit light because they are on a dark background and have been exposed to external sources of light. It will be seen that the ruled scale will be luminous in the presence of bright external illumination or in total darkness.

Figure 1:
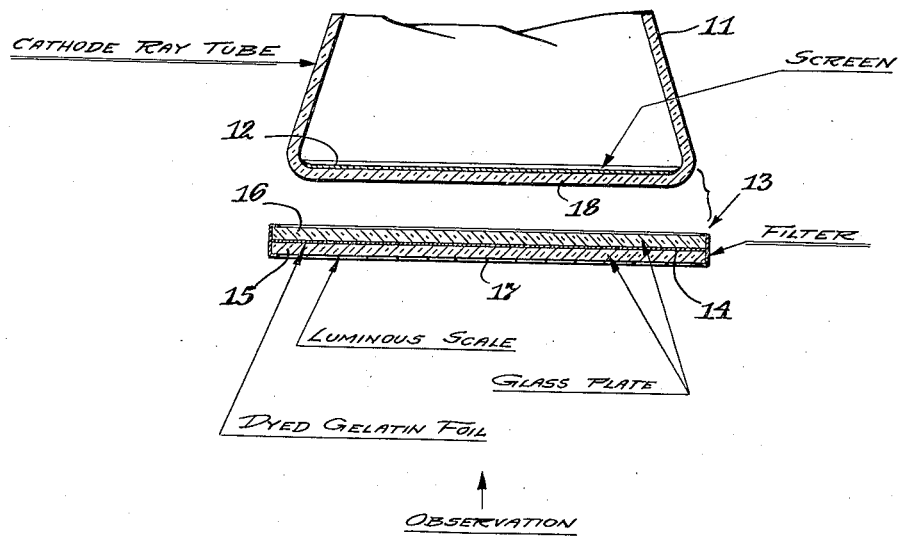
Fig. 1 is a fragmentary axial sectional view of a cathode ray tube with associated filter and luminous-paint scale.
Figure 2:
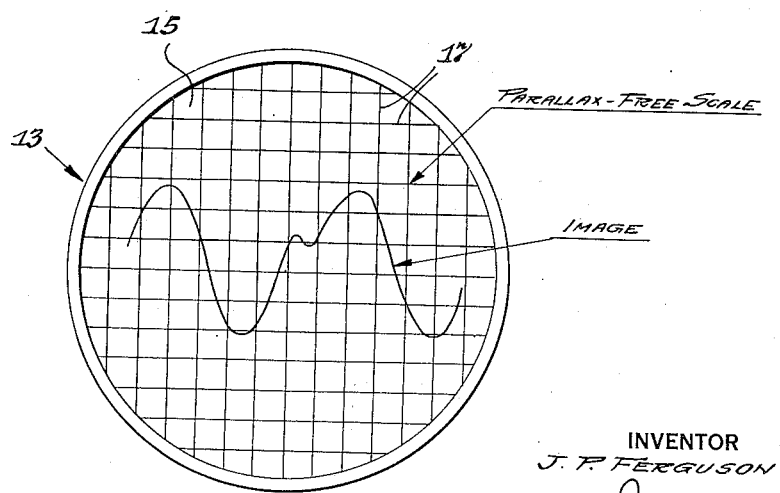
Fig. 2 is an end view of the tube after the filter and scale have been applied.

Referring to the drawing in detail, the reference character 11 designates a cathode-ray tube, only the one end or oscilloscope screen-carrying portion of which is illustrated. The screen on the end is indicated at 12 and may consist of suitable fluorescent material, green willamite being an example. Associated with said screen is a filter device formed as a combination filter and protective glass arrangement, designated generally as 13, and consisting of dyed gelatin foil 14 mounted between front and rear plates of glass 15 and 16. On one of the plates of glass, such as the front plate 15, is inscribed a parallax-free scale 17, in the present instance consisting of equally-spaced ruled normally horizontal self-luminous lines intersected by correspondingly spaced normally vertical self-luminous lines. This combination filter-scale arrangement may be disposed directly over and engaging the screen-carrying portion of the tube or spaced a slight distance therefrom, as shown in Fig. 1.

As an alternative the end wall 18 of the tube 11 may be formed of green glass or other desired filtering material and the scale 17 may be inscribed or ruled directly thereon, thereby avoiding the use of a separate filter and scale combination.

As examples of paints which I have used successfully in the construction of various self-luminous scales on color filters, I mention "Everlight" radium enamel, and "Radio" luminous calcium sulphide, both of which are made by the American Luminous Products Co., Huntington Park, California, and "Phosphorescent" paint made by the Fluorescent Pigments Corp., 445 West 41st Street, New York city. This latter paint can also be obtained in the form of a prefabricated paint film bonded between two sheets of transparent plastic. In this manner, the film can be cut into very thin strips and cemented on the selective color filter screen-carrying portion of the tube. The color emitted by this phosphorescent film is blue-green at approximately 5070 A. U. The paint can be excited by daylight or that from incandescent electric lamps.

As an example of how self-luminous paints may be applied in the making of scales, I might say that the first-mentioned luminous color, designated as "Everlight", consists of a finely granulated powder of yellowish color, which when observed in the dark immediately after exposure to light shows what might be termed "phosphorescence." This is, however, not to be confused with the "luminescence" which the compound exhibits even after being kept in the dark indefinitely. "Everlight" is desirably mixed in small quantities, as on a porcelain mixing-plate, with a transparent varnish, in an amount sufficient to produce a consistency which can be properly applied to the object to be coated, as by means of a fine brush or other suitable instrument such as a fine pointed pen. By applying "Everlight" to white letters or lines a greater degree of luminosity is obtained than by making the application to black or transparent surfaces.

"Radio" luminous calcium sulphide gives a white light for hours after initial activation and may be used as a base for luminous paint.

I have successfully used several types of selective color filters and recommend any one of the "Wratten" filters Nos. 55, 58 and 60 made by the Eastman Kodak Company, Rochester, New York. All three of these filters are particularly suitable for use with green willamite oscilloscope screens. However the "Wratten" filter No. 58 has a narrower band of transmission and, therefore, is somewhat more color-selective than the other two, making it particularly desirable.

"Wratten" filters are made of appropriately dyed gelatin cemented between sheets of plane-parallel glass, as illustrated in Fig. 1. Those Nos. 55, 58 and 60 have been found stable for approximately six months, that is, they will show no change in color due to exposure to sunlight for that length of time.

I have also used a filter made by the Corning Glass Company, known as No. 401, Sextant green, the light transmission being between 4500 and 6100 A. U. It comes in 6½" squares of polished glass. However, it is not as color-selective as any one of the three "Wratten" filters mentioned above.

From the foregoing disclosure it will be seen that I have devised an improved parallax-free luminous scale, applicable either directly to the oscilloscope screen-carrying portion of a cathode ray tube, which may be formed of desired filter glass, or to a separable filter for said tube. By virtue of my invention, additional equipment is believed unnecessary, and a parallax-free scale which requires no adjustment is provided. Appropriate color-selective filters can be ruled as described and used with cathode ray oscilloscopes whose screens emit light in the same or a different portion of the spectral band. However, a green filter with a ruled luminous scale has been used by me successfully and eliminates objectional glare from light reflected from the cathode ray screen.

Although preferred embodiments of my invention have been disclosed, it will be understood that modifications may be made within the spirit and scope of the appended claims.

I claim:

1. In combination, a cathode ray tube having an oscilloscope screen, and a filter with self-luminous lines forming a scale disposed in front of said screen.

2. In combination, a cathode ray tube having an oscilloscope fluorescent screen, a filter applied to said screen and corresponding in color with the light emitted by the latter, and lines of self-luminous paint forming a scale inscribed on said filter.

3. In combination, a cathode ray tube having a green willamite oscilloscope screen, a green filter thereover, and self-luminous lines forming a scale applied to said filter.

4. In combination, a cathode ray tube having a screen-carrying portion formed of green glass, a green willamite oscilloscope screen on said glass, and a self-luminous scale inscribed thereon.

5. In combination, a cathode ray tube having a screen-carrying portion formed of colored glass, an oscilloscope screen on said glass and of such a character than when activated it emits light of a color corresponding with that of said glass, and a self-luminous scale inscribed on said glass.

6. In combination, a cathode ray tube having an oscilloscope screen, a filter covering said screen, and self-luminous lines forming a scale on said filter.

7. In combination, a cathode ray tube having a green willamite oscilloscope screen, a green filter disposed in front of said screen, and self-luminous lines forming a scale on said filter.

8. In combination, a cathode ray tube having a green willamite oscilloscope screen, a green filter disposed in front of said screen, protective glass for said filter, and self-luminous lines forming a scale on said glass.

9. In combination, a cathode ray tube having a green willamite oscilloscope screen, a dyed gelatin filter disposed in front of said screen, and self-luminous intersecting lines forming a scale on said filter.

10. In combination, a cathode ray tube having a screen carrying portion, an oscilloscope screen on said portion, and self-luminous lines forming a scale also on said portion.

JOHN P. FERGUSON.

REFERENCES CITED

The following references are of record in the file of this patent:

UNITED STATES PATENTS

| Number | Name | Date |
|---|---|---|
| 789,811 | Kunz | May 16, 1905 |
| 1,302,353 | Friedrich | Apr. 29, 1919 |
| 1,969,573 | Montgomery | Aug. 7, 1934 |
| 2,090,922 | Von Ardenne | Aug. 24, 1937 |
| 2,124,225 | Batchelor | July 19, 1938 |
| 2,171,970 | Brett et al. | Sept. 5, 1939 |
| 2,195,444 | Brett | Apr. 2, 1940 |
| 2,251,984 | Cleaver | Aug. 12, 1941 |
| 2,270,307 | Karnes | Jan. 20, 1942 |
| 2,294,209 | Roder | Aug. 25, 1942 |
| 2,330,604 | Messner | Sept. 28, 1943 |

FOREIGN PATENTS

| Number | Country | Date |
|---|---|---|
| 426,797 | Great Britain | Oct. 10, 1933 |